Aug. 2, 1955　　　　E. J. GALLOWAY　　　　2,714,455
STRAINER
Filed May 18, 1953

INVENTOR.
Edwin J. Galloway
BY
Charles & French
Attys.

United States Patent Office 2,714,455
Patented Aug. 2, 1955

2,714,455

STRAINER

Edwin J. Galloway, Neenah, Wis., assignor to Neenah Milk Products Company, Neenah, Wis., a corporation of Wisconsin Application May 18, 1953, Serial No. 355,698

1 Claim. (Cl. 210—183)

The invention relates to strainers for straining various products and especially viscous food products such as condensed milk, sweetened condensed milk, sour cream, vegetable juices, and fruit juices.

The main object of the invention is to provide certain modifications and improvements over the strainer shown and described in my prior U. S. Patent No. 2,572,131, dated October 23, 1951, for "Strainer." In the present invention the lower partition and the concentric tubes are clamped in assembled relation with the upper partition whose peripheral portion has a sealed connection with the upper part of the body of the container and a removable top for said container, and each of the tubes has reinforcing annular corrugations at their mid-section and adjacent their ends.

The invention further consists in the several features hereinafter described and more particularly defined by the claim at the conclustion hereof.

Figure 1:
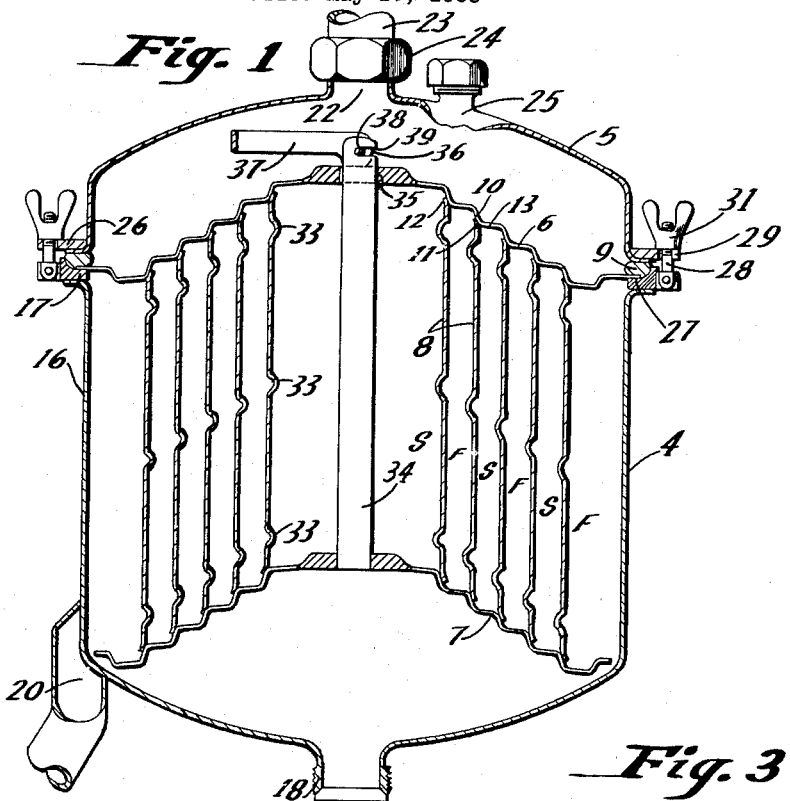
Fig. 1 is a vertical sectional view taken on the line 1—1 of Fig. 2 through a strainer embodying the invention, parts being broken away.

Referring to the drawings, the strainer comprises a container 4, a removable cover 5, partition members 6 and 7, tubes 8, a sealing ring 9, means for clamping the cover and the upper partition 6 to the container, and means for clamping the upper partition 6 to the tubes 8 and the partition 7 in assembled supporting relation therewith.

The partition members 6 and 7 are of stepped generally conical formation arranged so that the steps 10 are substantially equally spaced from each other so that the tubes 8 are of substantially equal length, thereby increasing the filtering capacity over that of my prior patent, it being noted that the steps of the partitions act to reinforce these members and that their backs 11 act as centering and sealing surfaces for the flared ends 12 of the tubes 8. The partitions 6 and 7 are formed of stainless sheet steel, and the bottoms 13 of alternate step portions 10 are provided with rows of holes which on partition 6 form inlets 14 and on partition 7 form outlets 15, the outlets 15 being offset one step from the inlets 14.

The container 4 is of stainless steel having a cylindrical side wall 16 provided with a flanged ring-reinforced top edge 17 and provided with an outlet opening 18 for connection to a discharge pipe 19 by a suitable coupling, similar to the coupling 24. A tripod support is provided by three equi-distantly spaced legs 20 welded to the bottom portion of the container body.

The cover 5 of stainless steel is of conical form having a central inlet opening 22 which may be connected to a supply pipe 23 by a coupling 24, a capped cleaning fluid inlet 25, and a flanged rim provided with a reinforcing metal ring 26.

The cover 5, the peripheral portion 27 of the partition 6, and the compressible sealing ring 9 are clamped in fluid-tight sealing relation with the flanged top of container 5 by bolts 28 pivotally anchored on the edge 17 and engageable in slots 29 of radially projecting portions 30 of the ring 26 and provided with clamping wing nuts 31 engaging the portions 30 of said cover.

Figure 3:
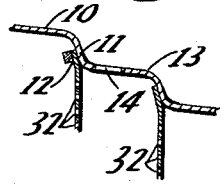
Fig. 3 is an enlarged detailed vertical sectional view taken on the line 3—3 of Fig. 2.
Figure 2:
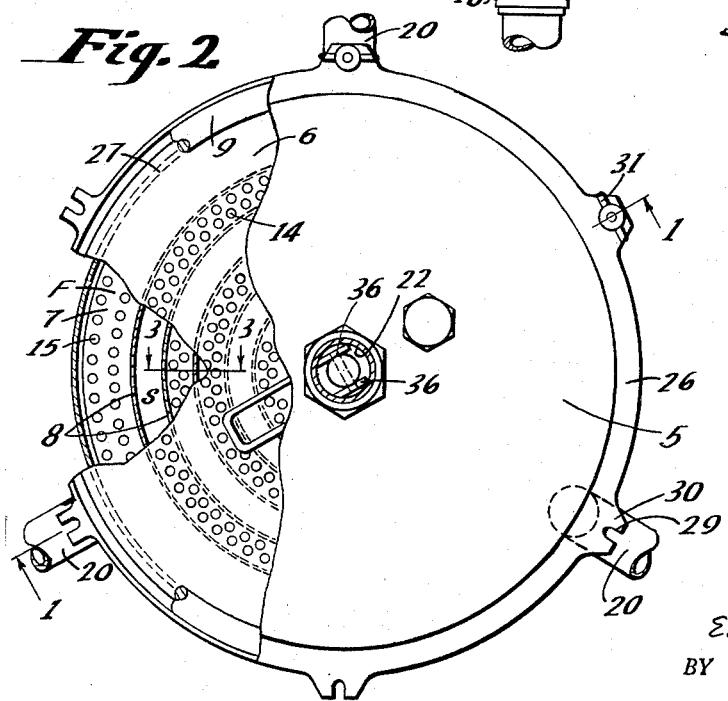
Fig. 2 is a plan view of the strainer, parts being broken away and parts being shown in section.

The tubes 8, of stainless sheet steel, are of cylindrical form and provided throughout their lengths with a number of small filtering perforations 32 which are indicated in Fig. 3. Each tube adjacent its top and its bottom and at its central portion is provided with an inwardly projecting bead or corrugation 33 to reinforce it against the clamping pressure exerted upon it by the partitions 6 and 7. The tubes 8 are all of the same length and are clamped between the partitions 6 and 7 by a centrally disposed drawbar 34 anchored at one end to the central portion of partition 7 and extending up through a hole 35 in the central portion of partition 6 and carrying a wedge acting cam portion 36 provided with a hand lever 37 and a pivot pin 38 adapted for insertion in a slot 39 in the bar 34 with cams 36 of the U-shaped lever 37 straddling the top of the bar.

It is to be noted that the periphery of the lower partition 7 does not contact the wall of container 5 but is spaced a short distance therefrom so that the whole filtering assembly is hung from the partition 6 to which partition 7 and tubes 8 are clamped. The parts of the filtering assembly may be readily separated by releasing the cam lock above described.

For cleaning purposes, the inlet opening 22 may be plugged, the pipe 19 uncoupled, and the outlet opening connected to a drain, and then a suitable caustic solution may be introduced through the inlet 25 and run through the container to loosen the strained material from the tubes 8 and thus facilitate the subsequent cleaning of the individual parts when the cover is taken off and the straining unit removed.

With the above construction the product to be strained is conducted by pipe 23 and opening 22 into the top of the container and then through the holes 14 in partition 6 into alternate spaces S between the tubes 8, and it is then strained through the finer perforations 32 into the adjacent spaces F from which it flows through the holes 15 in partition 7 into the bottom of container 5 and then through opening 18 to the discharge pipe 19. The sediment in spaces S held back by perforations 32 tends to be drawn to the bottom of these spaces by the force of gravity as the strained product flows through these perforations. The conical formation of the partitions 6 and 7 provides large flow spaces at the top and bottom of the container.

I desire it to be understood that this invention is not to be limited to any particular form or arrangement of parts except in so far as such limitations are included in the appended claim.

What I claim as my invention is:

In a strainer, the combination of a container, a removable cover for said container, a filtering unit disposed within said container comprising a pair of annularly stepped similarly oriented conical plates having apertures in alternate steps with the apertures of one plate offset relative to those of the other plate, concentric equal length apertured tubes of varying diameters engaging at their ends with the backs of the steps of said plates, said plates having reinforced central portions, a drawbar anchored to the central portion of one of the plates and extending through a central aperture in the other plate, cam lever means mounted on the extended end of said drawbar and engageable with said other plate to clamp said plates and tubes together in assembled relation, one of said plates having a peripheral extension, and means for clamping said cover and said peripheral extension in fluid-tight engagement with the container, there being flow passages for the material to be filtered in said container and cover.

References Cited in the file of this patent

UNITED STATES PATENTS

| | | |
|---|---|---|
| 446,342 | Goodacre | Feb. 10, 1891 |
| 590,968 | Davis | Oct. 5, 1897 |
| 1,564,666 | Griffin | Dec. 8, 1925 |
| 1,737,313 | Kamrath | Nov. 26, 1929 |
| 2,337,238 | Griffith | Dec. 21, 1943 |
| 2,572,131 | Galloway | Oct. 23, 1951 |